(12) United States Patent
Lehtinen (10) Patent No.: US 8,867,399 B2
(45) Date of Patent: Oct. 21, 2014

(54) SIGNAL MEASUREMENT

(71) Applicant: Broadcom Corporation, Irvine, CA (US)

(72) Inventor: Teijo Henrikki Lehtinen, Helsinki (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/012,462

(22) Filed: Aug. 28, 2013

(65) Prior Publication Data
US 2014/0160962 A1     Jun. 12, 2014

(30) Foreign Application Priority Data

Dec. 11, 2012  (GB) .................................. 1222292.3

(51) Int. Cl.
*H04B 17/00*     (2006.01)
*H04W 24/08*    (2009.01)

(52) U.S. Cl.
CPC ..................................... *H04W 24/08* (2013.01)
USPC ........... 370/252; 370/329; 370/224; 370/336; 455/423; 455/424

(58) Field of Classification Search
CPC ..... H04L 47/10; H04L 43/50; H04L 12/2697; H04W 24/00; H04W 24/08
USPC .......... 370/252, 329, 224, 336, 241; 375/224; 455/67.11, 423, 424
See application file for complete search history.

(56) References Cited

U.S. PATENT DOCUMENTS

| 6,993,293 | B1 | 1/2006 | Bevan et al. |
| 7,831,273 | B2 * | 11/2010 | Suonvieri ...................... 455/522 |
| 2006/0045045 | A1 * | 3/2006 | Blessent et al. ............... 370/328 |
| 2009/0149152 | A1 * | 6/2009 | Porco et al. ................ 455/343.1 |

FOREIGN PATENT DOCUMENTS

| EP | 1 193 896 A2 | 4/2002 |
| EP | 2 211 580 A1 | 7/2010 |

OTHER PUBLICATIONS

UKIPO Search Report under Section 1.7 compiled Jun. 10, 2013, which was issued in a related UK Application No. GB1222292.3 (1 page).

* cited by examiner

*Primary Examiner* — Jamal Javaid
(74) *Attorney, Agent, or Firm* — Foley & Lardner LLP; Christopher J. McKenna; Angela D. Murch

(57) ABSTRACT

Methods, apparatus and computer-readable storage mediums for determining a characteristic of a signal transmitted from a wireless transmitter, using a measurement receiver. A first characteristic, calculated in respect of a first time period, and a second characteristic, calculated in respect of a second time period, are used to extrapolate a measured characteristic, measured over the first time period, to determine a determined characteristic for the second time period.

20 Claims, 10 Drawing Sheets

SIGNAL MEASUREMENT

CROSS REFERENCE TO RELATED APPLICATION

This application claims the benefit under 35 §119(a) and 37 CFR §1.55 to UK Patent Application No. 1222292.3, filed on Dec. 11, 2012, the entire content of which is incorporated herein by reference.

TECHNICAL FIELD

The present disclosure relates to signal measurement. In particular, the present disclosure relates to methods, apparatus and computer software for determining a characteristic of a signal transmitted from a wireless transmitter.

BACKGROUND

Wireless communication devices are used, in general, to connect wirelessly to a network. Reliable operation of modern wireless communication devices often requires knowledge of characteristics such as the power or magnitude of signals transmitted by that device. This could be required for compliance with a given communication scheme or for increasing the power efficiency of a wireless communication device. Such knowledge could be used, for example, to modify power control, radiated power variation, power amplifier control, antenna tuner control, etc.

It is often not sufficient to calculate the characteristics of a transmitted signal by examining the signal data prior to transmittal. This could be due to unknown efficiency values, temperature effects, frequency dependency, impedance mismatches, and/or nonlinear properties of subsequent transmitter path components. In order to accurately determine the transmitted signal characteristics, it is known in the art to provide a measurement receiver at the wireless communication device in order to measure the signal immediately prior to transmission. Several measurement receiver arrangements are known in the art. For example, a resistor arrangement can be used prior to the antenna to divide resistively the signal between the antenna and a detector, such as a power detector. The output of the power detector can then be integrated to obtain a value proportional to the transmitted power over the measurement period, and further divided by the length of the measurement period in order to determine an average power value.

In order to operate a measurement receiver in such a way as to reflect accurately the power of the transmitted signal, several prior art arrangements require the transmitted signal to be measured over a relatively long period of time. This has the effect of mitigating the chance of measuring only an unusually high or low powered portion of the signal. The measurements made over this relatively long measurement period can then be averaged to obtain a value for the transmitted signal power over the same period. However, during operation, the measurement receiver is a current consuming component and hence operating the measurement receiver for a relatively long period of time consumes undesirable amounts of current. This is a particular problem for mobile wireless communication devices, where battery life is limited and current consumption should be constrained.

In other known measurement receiver arrangements, a coupler is used prior to the antenna to monitor the signal and can be used to determine both forward and reflected power. Forward power is typically measured via a first port on the coupler and power reflected from the antenna is measured via a second port on the coupler. These measurements can be used to determine the difference or ratio between forward and reflected power. However, again, long measurement periods are required for accurate readings, and this is compounded by the requirement to separately measure both forward and reflected power during the same transmission.

Further known measurement receiver arrangements provide precise synchronisation between the measured signal and the data components of the transmitted signal through the use of correlating logic. This type of measurement receiver arrangement is known as a fully coherent receiver and allows for single measurement samples to be utilised through precise phase correlation. In this way, the presence of the various peaks and troughs in the transmitted signal can be accurately predicted and the measured value can be scaled accordingly to determine the characteristics of the transmitted signal. However, such fully coherent measurement receiver arrangements require a significant amount of correlation logic which increases hardware complexity and cost. Additionally, as there is no averaging of the signal envelope, such arrangements do not determine average power, only analogue gain and phase.

Hence, it would be desirable to provide improved measures for determining characteristics of a signal transmitted from a wireless transmitter, including measures with reduced power consumption and/or hardware complexity.

SUMMARY

In accordance with first embodiments, there is a method of determining a characteristic of a signal transmitted from a wireless transmitter in a telecommunications network, the wireless transmitter including a measurement receiver, the method including:

determining, on the basis of at least one signal supplied to the transmitter, a first characteristic of the transmitted signal over a first time period;

determining, on the basis of the at least one signal supplied to the transmitter, a second characteristic of the transmitted signal over a second, different, time period; and determining, on the basis of at least the first characteristic, the second characteristic and a measured characteristic of the transmitted signal measured at the measurement receiver over the first time period, a determined characteristic for the transmitted signal in relation to the second time period.

In accordance with second embodiments, there is apparatus for use in determining a characteristic of a signal transmitted from a wireless transmitter, the wireless transmitter including a measurement receiver, the apparatus being adapted to:

determine, on the basis of at least one signal supplied to the transmitter, a first characteristic of the transmitted signal over a first time period;

determine, on the basis of the at least one signal supplied to the transmitter, a second characteristic of the transmitted signal over a second, different, time period; and determine, on the basis of at least the first characteristic, the second characteristic and a measured characteristic measured at the measurement receiver over the first time period, a determined characteristic for the transmitted signal in relation to the second time period.

In accordance with third embodiments, there is a non-transitory computer-readable storage medium including a set of computer-readable instructions stored thereon, which, when executed by a processing system, cause the processing system to carry out a method for use in determining a characteristic of a signal transmitted from a wireless transmitter in a telecommunications network, the wireless transmitter including a measurement receiver, the computer-readable instructions being adapted to cause the processing system to:

determine, on the basis of at least one signal supplied to the transmitter, a first characteristic of the transmitted signal over a first time period;

determine, on the basis of the at least one signal supplied to the transmitter, a second characteristic of the transmitted signal over a second, different, time period; and determine, on the basis of at least the first characteristic, the second characteristic and a measured characteristic of the transmitted signal measured at the measurement receiver over the first time period, a determined characteristic for the transmitted signal in relation to the second time period.

In accordance with further embodiments, there is a method of determining the average power of a signal transmitted from a wireless transmitter, the wireless transmitter including a measurement receiver, the method including:

determining, on the basis of at least one signal supplied to the transmitter, a first value proportional to the average power of the transmitted signal over a first time period;

determining, on the basis of the at least one signal supplied to the transmitter, a second value proportional to the average power of the transmitted signal over a second, different, time period; and determining, on the basis of at least the first value, the second value and a measured average power value for the transmitted signal measured at the measurement receiver over the first time period, a determined average power value for the transmitted signal in relation to the second time period.

In accordance with further embodiments, there is apparatus for use in determining the average power of a transmitted signal transmitted via a wireless transmitter, the wireless transmitter including a measurement receiver, the apparatus being adapted to:

determine, on the basis of at least one signal supplied to the transmitter, a first value proportional to the average power of the transmitted signal over a first time period;

determine, on the basis of the at least one signal supplied to the transmitter, a second value proportional to the average power of the transmitted signal over a second, different, time period; and determine, on the basis of at least the first value, the second value and a measured average power value for the transmitted signal measured at the measurement receiver over the first time period, a determined average power value for the transmitted signal in relation to the second time period.

In accordance with further embodiments, there is a non-transitory computer-readable storage medium including a set of computer-readable instructions stored thereon, which, when executed by a processing system, cause the processing system to carry out a method for use in determining the average power of a signal transmitted from a wireless transmitter, the wireless transmitter including a measurement receiver, the computer-readable instructions being adapted to cause the processing system to:

determine, on the basis of at least one signal supplied to the transmitter, a first value proportional to the average power of the transmitted signal over a first time period;

determine, on the basis of the at least one signal supplied to the transmitter, a second value proportional to the average power of the transmitted signal over a second, different, time period; and determine, on the basis of at least the first value, the second value and a measured average power value for the transmitted signal measured at the measurement receiver over the first time period, a determined average power value for the transmitted signal in relation to the second time period.

Further features and advantages of the disclosure will become apparent from the following description of preferred embodiments, given by way of example only, which is made with reference to the accompanying drawings.

DETAILED DESCRIPTION

Figure 1:
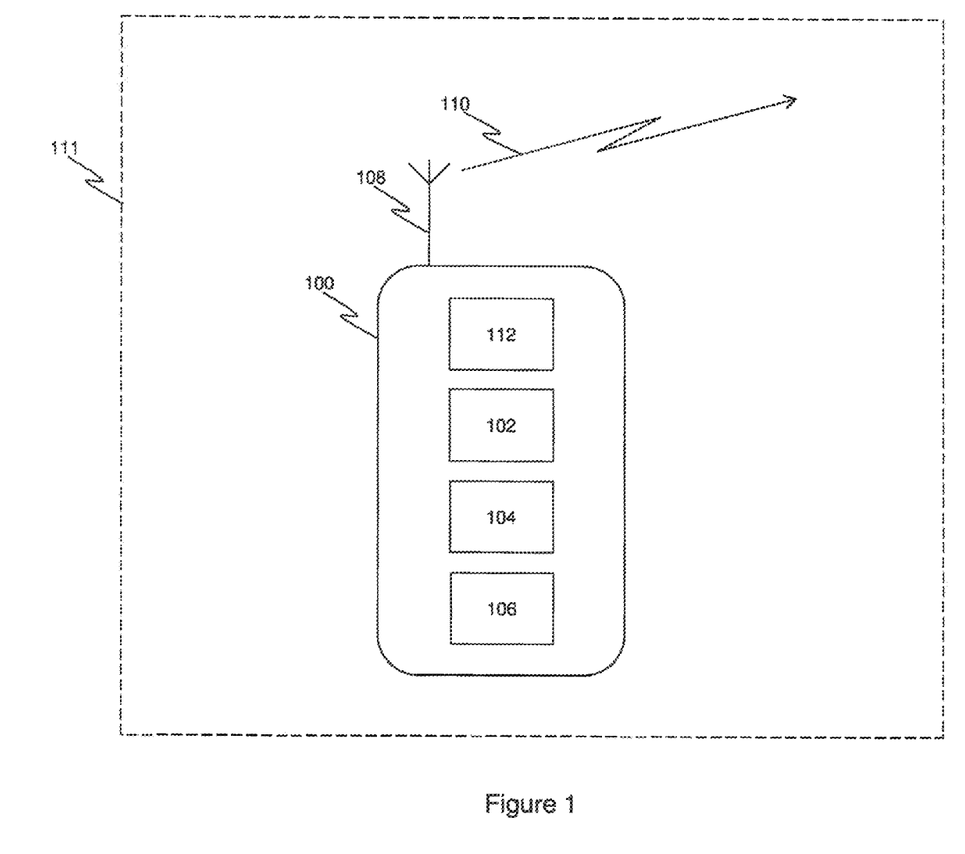
FIG. 1 shows schematically a wireless communication device according to embodiments.

FIG. 1 shows schematically a wireless communication device 100 according to embodiments. The wireless communication device 100 contains a radio module 102, processor(s) 104, memory/memories 106, antenna 108, etc. to enable wireless communication with telecommunications network 111. The wireless communication device 100 is in communication with a remote endpoint in telecommunications network 111, such as a radio mast (not shown), as depicted by transmitted signal 110. Wireless communication device 100 is further provided with a measurement receiver 112 for the purposes of determining characteristics of transmitted signal 110.

"Wireless communication devices" include in general any device capable of connecting wirelessly to a network, and include in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. A "wireless communication device" may also be a module or chipset that can be attached to or installed in any of the above devices. The term "user equipment" or UE is often used to refer to wireless devices in general, and particularly mobile wireless devices.

The terms "transmitter" and "receiver" are also used herein and are to be construed broadly to include the whole of a device that is transmitting/receiving wireless signals as well as only parts of or particular components of a device that are concerned with transmitting/receiving wireless signals or causing or leading to the transmission/reception of wireless signals.

The present disclosure provides methods, apparatus and computer software for determining a characteristic of signal 110 transmitted from the wireless transmitter 108, through the novel use of a measurement receiver 112. According to embodiments, the wireless transmitter is operated according to the determined characteristic. This could be, for example, to modify power control, radiated power variation, power amplifier control or antenna tuner control. According to embodiments, the determined characteristic is signalled to the network. According to embodiments, the determined characteristic is a power value. The operation of embodiments of the present disclosure will now be discussed in relation to FIG. 2.

Figure 2:
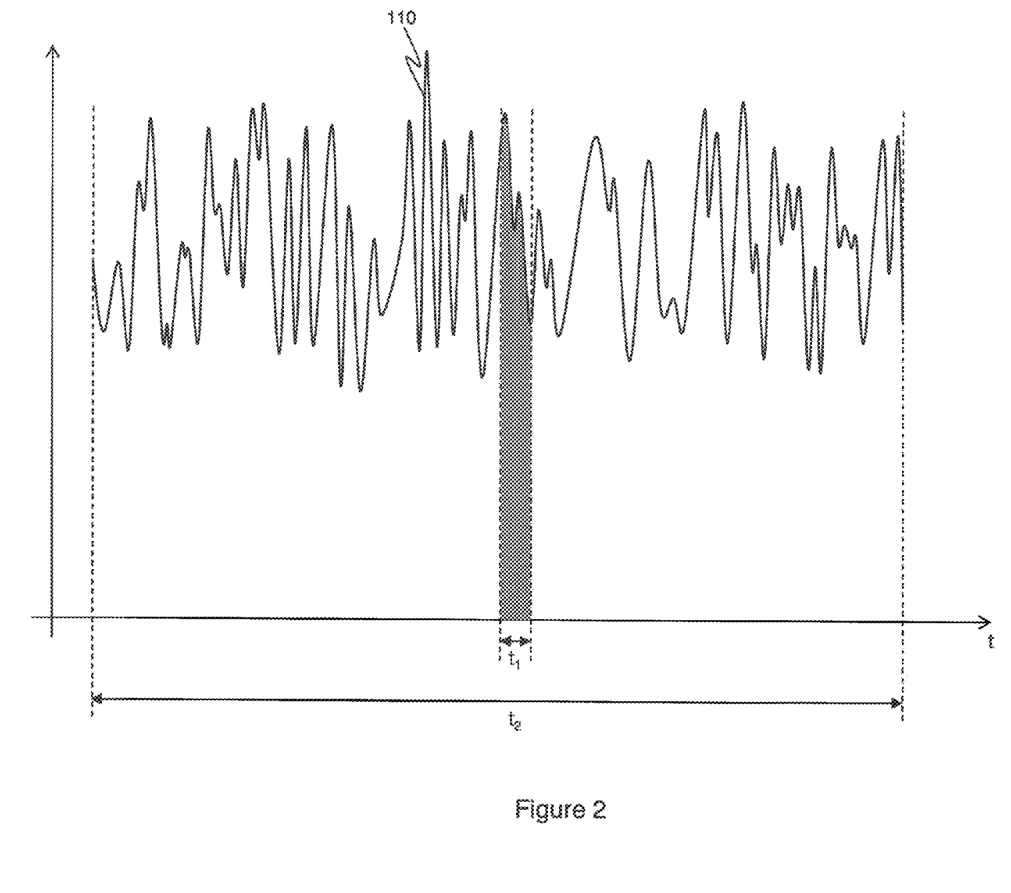
FIG. 2 shows a graph depicting the operation of wireless communication device according to embodiments.

FIG. 2 shows a graph depicting the operation of wireless communication device 100 according to embodiments. According to embodiments, the ordinate represents time and the abscissa represents the transmitted signal magnitude, prior to or subsequent to transmission. By analysing the data components of signal 110 that are formed prior to transmittal, a first value proportional to the average power of the signal over a first time period ($t_1$) and a second value proportional to the average power of the signal over a second time period ($t_2$) are determined. During transmittal, the measurement receiver (possibly in combination with one or more further components) is used to measure a measured average power value for the transmitted signal in relation to the first time period ($t_1$). Knowledge of the relationship between the first value (proportional to the average power of the transmitted signal over the first time period ($t_1$)), and the second value (proportional to the average power of the transmitted signal over the second time period ($t_2$)), is then used to extrapolate the measured average power value, measured in relation to the first time period ($t_1$), to determine a determined average power value for the second time period ($t_2$). Hence, by using knowledge of data components of the signal during the first and second time periods, embodiments of the present disclosure enable an average power value to be determined for the transmitted signal over the second time period ($t_2$) without the requirement to operate the measurement receiver for the same period of time. Further, by using values averaged over a period of time, instead of single samples, the need for complicated correlating logic is removed.

In an analogous manner, other characteristics of the transmitted signal, such as average magnitude, RMS power etc., can be determined if an appropriate detector is used. A first characteristic, calculated in respect of a first time period, and a second characteristic, calculated in respect of a second time period, can be used to extrapolate a measured characteristic, measured over the first time period, to determine a determined characteristic for the second time period. The majority of the embodiments described in detail below pertain to determining an average power value for the transmitted signal; however, it will be clear to a person skilled in the art that other characteristics of the transmitted signal can be calculated in an analogous manner.

The first and second values, (i.e. those values proportional to the average power of the transmitted signal over the first and second time periods, $t_1$ and $t_2$, respectively) can be obtained from the data signal components by various different algorithms. Once such example includes calculating the square of the amplitude of the signal in order to obtain a value proportional to the power of the transmitted signal. A number of further suitable alternative calculations will be apparent to those skilled in the art.

According to embodiments, the determined average power value is calculated by scaling the measured average power value by the ratio of the second value to the first value.

In the embodiments depicted in FIG. 2, the first time period ($t_1$) is shown as being smaller than, and included within, the second time period ($t_2$). According to alternative embodiments, the first time period is of equal or greater duration than the second time period. According to further alternative embodiments, the first time period only partially overlaps with the second time period. According to yet further alternative embodiments, the first time period does not overlap the second time period. In some embodiments, the second time period ($t_2$) includes a power control slot or transmission slot, in a communication scheme, such as LTE (Long Term Evolution) or UMTS (Universal Mobile Telecommunications System).

Figure 3A:
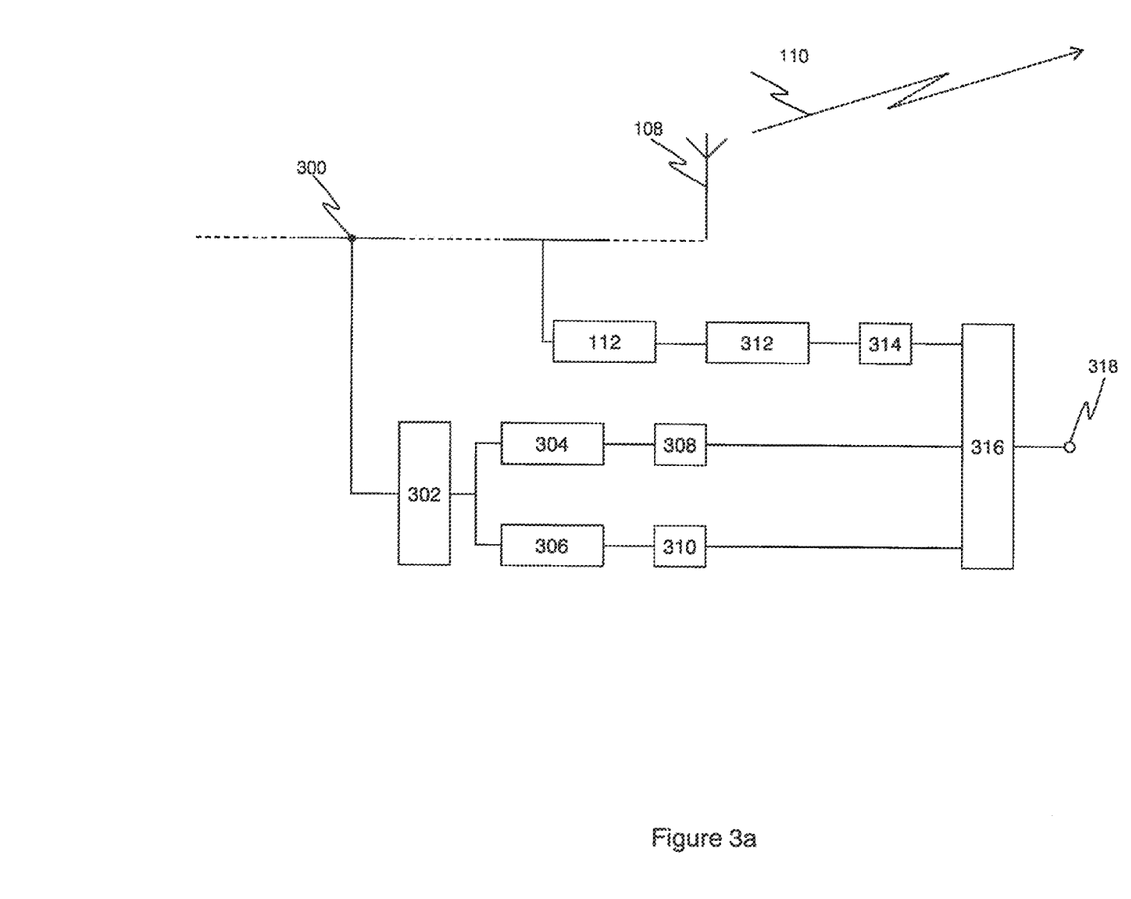
FIG. 3a shows schematically the transmitted signal characteristic determination hardware of a wireless communication device according to embodiments.

FIG. 3a shows schematically the transmitted signal power determination hardware of wireless communication device 100 according to embodiments. Transmitted signal 110 is transmitted via antenna 108, and measured prior to transmission via measurement receiver 112. The signal 300 that is supplied to the transmitter prior to transmittal of transmitted signal 110 is used to form an input to the transmitted signal power determination hardware components. There may be a number of further transmitter path components before and/or after the point at which the signal supplied to the transmitter is used as an input to the transmitted signal power determination hardware, as shown by the broken lines in FIG. 3a. Such further transmitter path components may include a number of digital-to-analogue converters, filters, antenna tuners, mixers, local oscillators and/or amplifiers (not shown).

According to embodiments, input signal 300 is a digital signal. This has the effect of causing the subsequent determination processing to consume less current than either the equivalent processing performed in the analogue domain or performing a prior analogue to digital conversion. However, according to alternative embodiments, input signal 300 is an analogue signal.

The input signal 300 is fed into power calculation unit 302 which converts the raw data components into a metric proportional to the power of the transmitted signal, for example by calculating the square of the signal amplitude. This result is then fed into a first integrating unit 304, which integrates the output of power calculation unit 302 over the first time period, and a second integrating unit 306, which integrates the output of power calculation unit 302 over the second time period. The result produced by integrating unit 304 is fed into dividing unit 308, which divides the result produced by integrating unit 304 by the duration of the first time period in order to determine a value proportional to the average power of the transmitted signal over the first time period. Likewise, the result produced by integrating unit 306 is fed into dividing unit 310, which divides the result produced by integrating unit 306 by the duration of the second time period in order to determine a value proportional to the average power of the transmitted signal over the second time period. According to embodiments, the duration of a respective time period includes a number of processor clock cycles, a number microseconds or as number of milliseconds, etc. According to embodiments, the signal is sampled during/prior to the processing by one or more of the integrating units (304, 306) in order to produce the respective result. According to some such embodiments, samples are taken at regular intervals and the duration of the respective time periods includes a number of samples taken over the respective integration operations. In embodiments, power calculation unit 302, integrating units 304 and 306, and dividing units 308 and 310 form a first determining stage, which may also include a number of further components (not shown).

According to embodiments, the first and second time periods are predetermined. In embodiments, the first and second time periods are stored in memory in the wireless communication device. In some embodiments, the first and second time periods are user configurable. According to embodiments, the first and second time periods are configurable in response to signalling information received from the network. According to embodiments, the first time period is defined relative to the position and/or duration of the second time period. In embodiments, the second time period includes an allocated transmission slot for the transmitted signal in a communication session with a remote party. Such embodiments enable an average power value to be determined for the transmitted signal over the entire allocated transmission slot.

In embodiments, measurement receiver 112 includes a power detector, for example a diode power detector, transistor power detector, rectifier, mixer detector, etc. In some embodiments, the signal to be transmitted may be divided between the power detector and antenna 108, for example using resistive, capacitive or inductive division. In alternative embodiments, measurement receiver 112 includes a coupler for providing the input signal to the power detector. In embodiments, measurement receiver 112 also includes an analogue to digital converter adapted to convert the measured power values into digital representations thereof for further processing in the digital domain. During transmission, the power of the transmitted signal measured at measurement receiver 112 is measured over the first time period. The measured signal is fed into integrating unit 312, which integrates the power of the signal measured at measurement receiver 112 over the first time period. The result produced by integration unit 312 is then fed into dividing unit 314 which divides the result produced by integrating unit 312 by the duration of the first time period in order to determine an average measured power value over the first time period. Again, according to embodiments, the duration of the time period includes a number of processor clock cycles, a number microseconds or a number of milliseconds, etc. According to embodiments, the signal is sampled during/prior to the processing by integrating unit 312 in order to produce the respective result. According to alternative embodiments, the duration of a respective time period includes a number of samples taken over the respective integration operation. In embodiments, integrating unit 312 and dividing unit 314 are included in measurement receiver 112, which may also include a number of farther components (not shown).

Determining unit 316, is adapted to operate on the first value (proportional to the average power of the transmitted signal over the first time period), the second value (proportional to the average power of the transmitted signal over the second time period) and the measured average power value for the first time period in order to determine a determined average power value 318 for the second time period. According to embodiments, determining unit 316 divides the first value by the value proportional to the average power of the transmitted signal over the first time period in order to determine a ratio of the average signal power of the transmitted signal over the second time period to the first time period. The measured average power value for the first time period is then scaled by this ratio to determine an average power value for the second time period.

According to embodiments, the integration performed by one or more of integrating units 304, 306 and 312 is performed in the digital domain. This has the effect of consuming less current than an equivalent integration operation performed in the analogue domain once the signal has been synthesised into an analogue signal. According to alternative embodiments, the integration performed by one or more of integrating units 304, 306 and 312 is in the analogue domain.

Figure 3B:
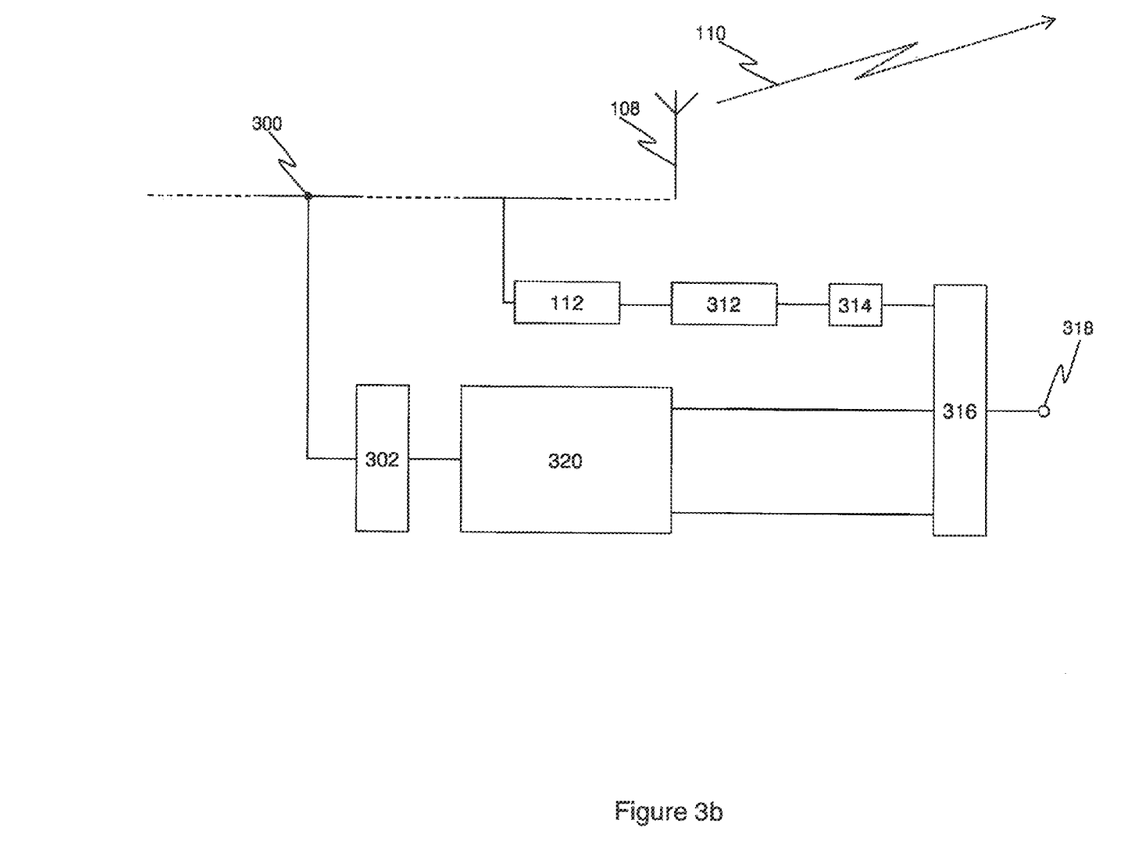
FIG. 3b shows schematically the transmitted signal characteristic determination hardware of a wireless communication device according to embodiments.

FIG. 3b shows schematically the transmitted signal power determination hardware of wireless communication device 100 according to further embodiments. The operation of antenna 108, transmitted signal 110, measurement receiver 112, input signal components 300, power calculation unit 302, integrating unit 312, dividing unit 314, determining unit 316, and determined average power value 318 are the same as described previously in FIG. 3a. However, in order to avoid the duplication of integrating units, a single combined integrating and dividing unit 320 is provided. Integrating unit 320 integrates over the whole of the second time period. The integration performed in relation to the first time period is accumulated to generate a first integration result, and the integration performed in relation to the rest of the second time period is accumulated to generate a second integration result. The first integration result is then divided by the duration of the first time period in order to determine an average value for the first time period. The sum of the first and second integration results is then divided by the duration of the first second period in order to determine an average value for the second time period. In the embodiments shown in FIG. 3b, power calculation unit 302 and combined integrating and dividing unit 320 form a first determining stage, which may also include a number of further components (not shown).

The operation and/or complexity of the single integrating and dividing unit 320 may be further reduced in embodiments wherein the first time period ($t_1$) and the second time period ($t_2$) do not overlap. In such circumstances, the calculation of the first value and the second value can be performed largely sequentially and not simultaneously. This may serve to further alleviate the requirement for duplication of integrating or dividing units.

Figure 4A:
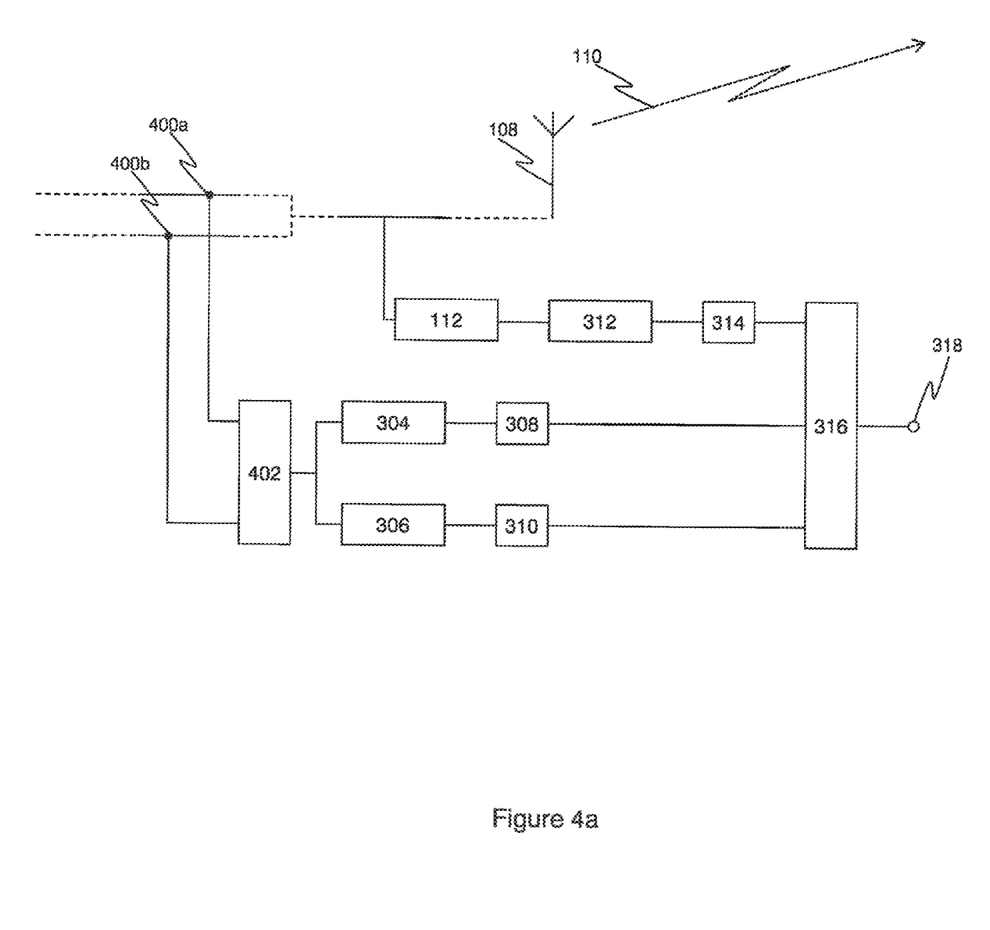
FIG. 4a shows schematically the transmitted signal characteristic determination hardware of a wireless communication device according to embodiments.

FIG. 4a shows schematically the transmitted signal power determination hardware of wireless communication device 100 according to embodiments. In some embodiments, the transmitted signal is made up of more than one data component. In the embodiments shown in FIG. 4a, the transmitted signal includes two components. Hence, in the embodiments shown in FIG. 4a, the transmitted signal power determination hardware uses both a first signal 400a that is supplied to the transmitter, and a second signal 4001 that is supplied to the transmitter as inputs. According to embodiments, the two data components include in-phase (I) and quadrature-phase (Q) components of a quadrature encoded modulation scheme.

The input signals 400a and 400b are fed into power calculation unit 402, which converts the raw data components into a metric proportional to signal power. According to some embodiments, this conversion is performed on the digital I and Q data components in the digital domain. According to some embodiments, input signals 400a and 400b are digital signals. Operating on the digital signals in the digital domain has the result of consuming less current than a corresponding operation in the analogue domain where current consuming analogue electronics are needed (including radio frequency amplifiers, dividers, detectors, buffers, analogue to digital converters etc).

According to some embodiments, this includes squaring the data component of the first input signal, squaring the data component of the second input signal and summing the results (e.g. performing an $I^2+Q^2$ operation). According to other embodiments, this includes utilising a CORDIC (COordinate Rotation Digital Computer) algorithm (e.g. performing a $\sqrt{(I^2+Q^2)}$ operation). In some such embodiments a CORDIC hardware block is included in power calculation unit 402. The operation and/or function of antenna 108, transmitted signal 110, measurement receiver 112, integrating units 304 and 306, dividing units 308 and 310, integrating unit 312, dividing unit 314, determining unit 316, and determined power value 318 are the same as described previously in relation to FIG. 3a, FIG. 4b shows schematically the transmitted signal power determination hardware of wireless communication device 100 according to embodiments wherein the transmitter includes a direct conversion transmitter. The transmitter path hardware includes digital to analogue converters 406 and 408, filters 410 and 412, mixers 414 and 416, local oscillator 418, quadrature generator 420, summing block 422, power amplifier 424 and antenna 108. The operation of direct conversion transmitter hardware is well known in the art and is therefore not described further herein. According to the embodiments shown in FIG. 4b, the digital data components of the signal (I and Q) form the input to power calculation unit 402.

During transmittal, the power of the transmitted signal is measured via measurement receiver 112. At measurement receiver 112, the input signal is supplied to direct conversion receiver hardware including local oscillator 428, quadrature generator 430, mixers 432 and 434, filters 436 and 438, analogue to digital converters 440 and 442, and power calculation unit 444. The operation of direct conversion receiver hardware is well known in the art and is therefore not described further herein. According to the embodiments shown in FIG. 4b, the received data components of the signal (I and Q) form the input to power calculation unit 444. Power calculation unit 444 is adapted to calculate the power of the signal measured at the measurement receiver on the basis of the I and Q data components isolated by the direct conversion receiver hardware. According to embodiments, measurement receiver 112 includes some or all of the direct conversion receiver hardware.

Figure 4B:
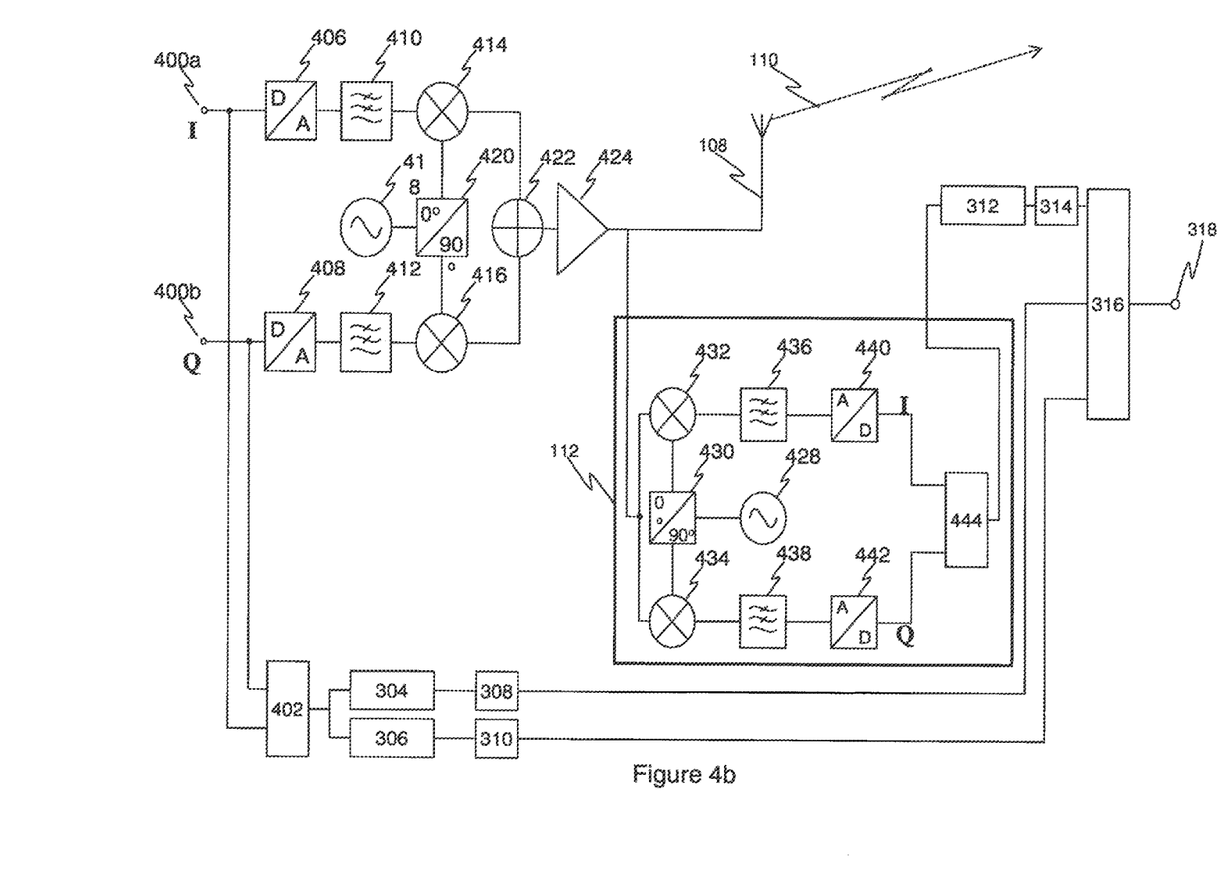
FIG. 4h shows schematically the transmitted signal characteristic determination hardware of a wireless communication device according to embodiments.

The operation and/or function of antenna 108, transmitted signal 110, measurement receiver 112, power calculation block 402, integrating units 304 and 306, dividing units 308 and 310, integrating unit 312, dividing unit 314, determining unit 316, and determined average power value 318 are similar to as described previously in relation to FIG. 4a.

One example method for calculating a value proportional to the average transmitted power of a signal including I and Q data components over a given time period in a direct conversion IQ transmitter, includes integrating the sum of the squared I and Q data samples prior to digital to analogue conversion and dividing the integrated value by the number of samples (N):

$$\text{Value} = \frac{\sum_{k=0}^{N} (I_k^2 + Q_k^2)}{N}.$$

Other methods of determining a value proportional to the average power of the transmitted signal over a given time period from the signal components will be apparent to those skilled in the art, in particular, methods suitable for other transmitter arrangements. According to further embodiments, the transmitted signal includes more than two data components. In such embodiments, the power calculation unit is expanded in an analogous manner to that depicted in FIG. 4a.

Figure 5:
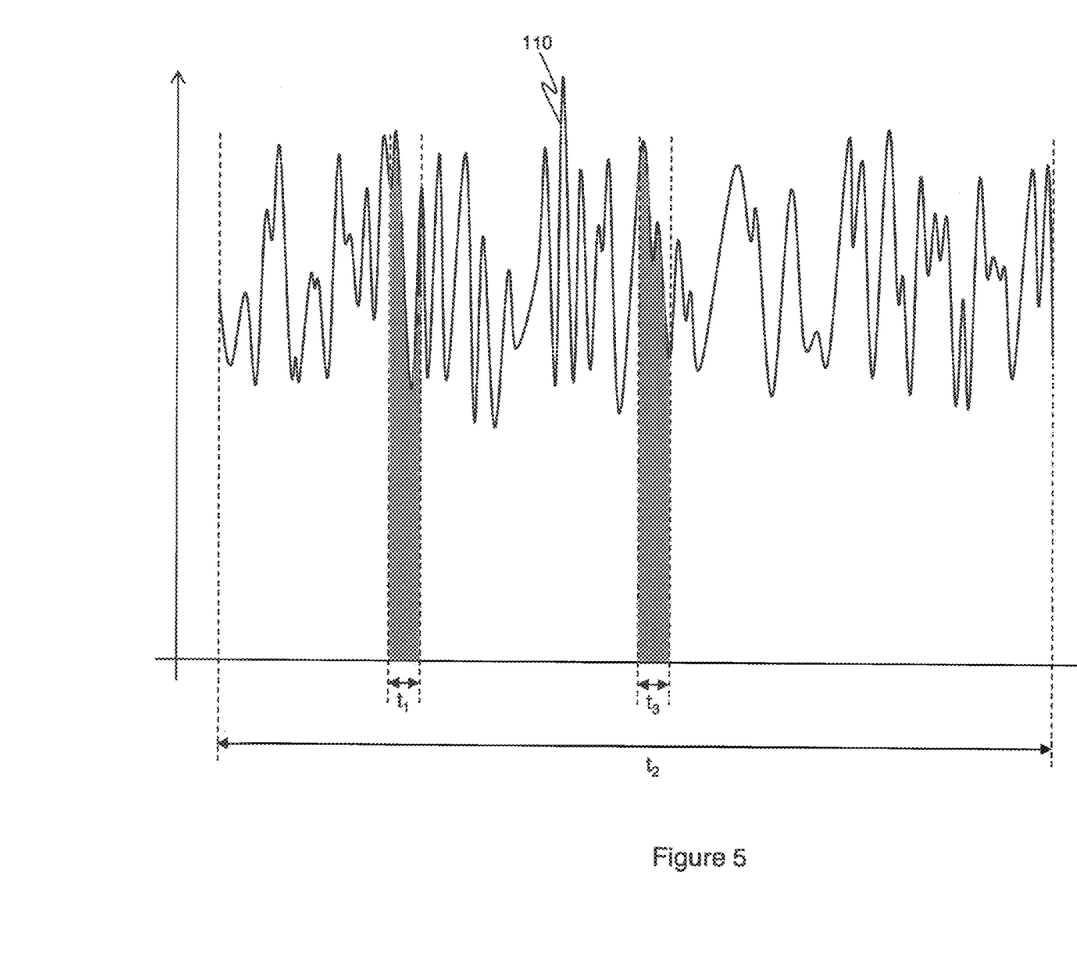
FIG. 5 shows a graph depicting the operation of a wireless communication device according to embodiments.

FIG. 5 shows a graph depicting the operation of wireless communication device 100 according to further embodiments. According to embodiments, the ordinate represents time and the abscissa represents the signal magnitude of the transmitted signal, prior to or subsequent to transmission. According to the embodiments shown in FIG. 5, transmitted signal 110 is measured at measurement receiver 112 during more than one time period ($t_1$ and $t_3$). The values measured during each of these measurement time periods ($t_1$ and $t_3$) can each be used to determine an average power value for the transmitted signal during the second time period $t_2$, in the manner described previously in relation to FIG. 2. In this way, a plurality of determined average power values can be calculated, and further averaged to improve the accuracy of the result. According to embodiments, the second time period $t_2$ is of greater duration than the third time period $t_3$. According to alternative embodiments, the third time period is of equal or greater duration than the second time period. According to embodiments, the third time period is included within the second time period. According to alternative embodiments, the third time period only partially overlaps with the second time period, or lies outside the second time period entirely. According to embodiments, the third time period does not overlap the first time period. According to alternative embodiments, the third time period only partially overlaps with the first time period. According to yet further alternative embodiments, the third time period does not overlap one or more of the first time period or the second time period. In embodiments where the third time period does not overlap either the first time period or the second time period, calculation of the first value, the second value and the third value can be performed largely sequentially and not simultaneously, thereby reducing the complexity of the determination hardware can be as a result of alleviating the requirement for duplication of integrating or dividing units.

Figure 6:
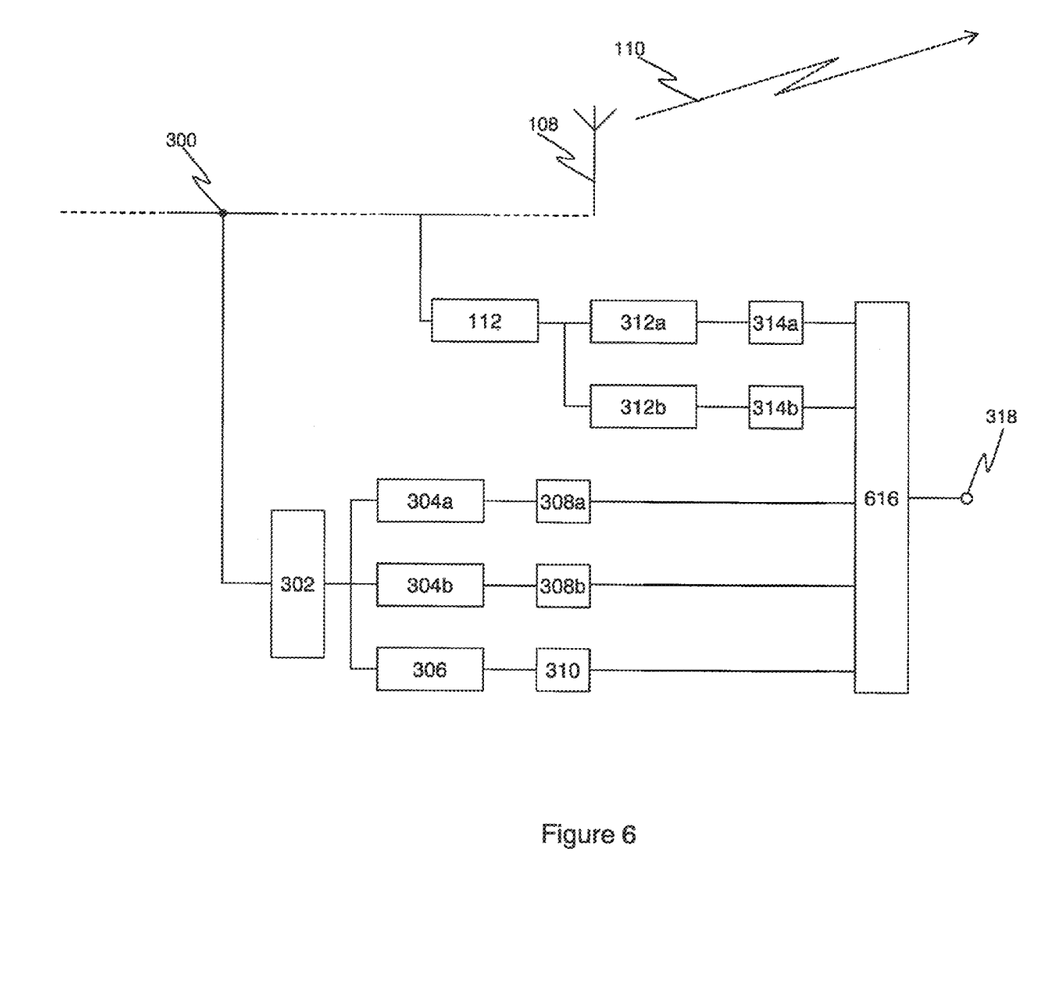
FIG. 6 shows schematically the transmitted signal characteristic determination hardware of wireless a communication device according to embodiments.

According to embodiments, the third time period is predetermined. In embodiments, the third time period is stored in memory in the wireless communication device. In some embodiments, the third time period is user configurable. According to embodiments, the third time period is configurable in response to signalling information received from the network. According to embodiments, the third time period is defined relative to the position and/or duration of the second time period, FIG. 6 shows schematically the transmitted signal power determination hardware of wireless communication device 100 according to embodiments in which the transmitted signal is measured during more than one time period. The operation of antenna 108, transmitted signal 110, measurement receiver 112, input signal 300 and power calculation unit 302 are the same as described previously in relation to FIG. 3a.

The result produced by power calculation unit 302 is fed into first integrating unit 304a which integrates the output of power calculation unit 302 over first time period $t_1$, second integrating unit 306 which integrates the output of power calculation unit 302 over the second time period $t_2$ and third integrating unit 304b which integrates the output of power calculation unit 302 over third time period $t_3$. The result produced by integrating unit 304a is fed into dividing unit 308a, which divides the result produced by integrating unit 304a by the duration of first time period $t_1$ in order to determine an average value in relation to first time period $t_1$. The result produced by integrating unit 306 is fed into dividing unit 310, which divides the result produced by integrating unit 306 by the duration of the second time period in order to determine an average value for the second time period. The result produced by integrating unit 304b is fed into dividing unit 308b, which divides the result produced by integrating unit 304b by the duration of third time period $t_3$ in order to determine an average value for third time period $t_3$.

During transmission, the power of the transmitted signal measured at measurement receiver 112 is measured over both the first time period and the third time period. The signal measured by measurement receiver 112 is fed into integrating unit 312a, which integrates the power of the signal measured at measurement receiver 112 over the first time period $t_1$, and also into integrating unit 312b, which integrates the power of the signal measured at measurement receiver 112 over the third time period $t_3$. The result produced by integration unit 312a is fed into dividing unit 314a which divides the result produced by integrating unit 312a by the duration of the first time period in order to determine an average measured power value over the first time period. Likewise, the result produced by integration unit 312b is fed into dividing unit 314b which divides the result produced by integrating unit 312b by the duration of the third time period in order to determine an average measured power value over the third time period.

Determining unit 616, is adapted to operate on the value for the first time period, the value for the second time period, the value for the third time period, the measured average power value for the first time period and the measured average power value for the third time period in order to determine a determined average power value 318 for the second time period. According to embodiments, determining unit 616 divides the value for the second time period by the value for the first time period in order to determine a ratio of the values for the second time period to the first time period. The measured average power value for the first time period is then scaled by this ratio to determine a first average power value for the second time period. Determining unit 616 also divides the value for the second time period by the value for the third time period in order to determine a ratio of the values for the second time period to the third time period. The measured average power value for the third time period is then scaled by this ratio to determine a second average power value for the second time period. The first and second average power values for the second time period are then further averaged to obtain a more accurate determined average power value for the second time period.

According to embodiments, the duplication of integrating units is avoided by utilising combined integrating and dividing units as described in relation to FIG. 3b. According to further embodiments, yet further measurement time periods (such as $t_1$ and $t_3$) are implemented. In such embodiments, the transmitted signal power determination hardware is expanded in an analogous manner to that depicted in FIG. 6.

According to the embodiments shown in FIG. 6, the signal measured by measurement receiver 112 is integrated over the first time period $t_1$ by integrating unit 312a, and integrated over the third time period $t_3$ by integrating unit 312b. However, in embodiments wherein the first time period and the second time period do not overlap, this duplication of integrating units 312a and 312b (and subsequent dividing units 314a and 314b) may be avoided by using a single integrating unit for sequentially integrating over the first time period $t_1$ and then the third time period $t_3$, thereby reducing the hardware complexity.

Figure 7:
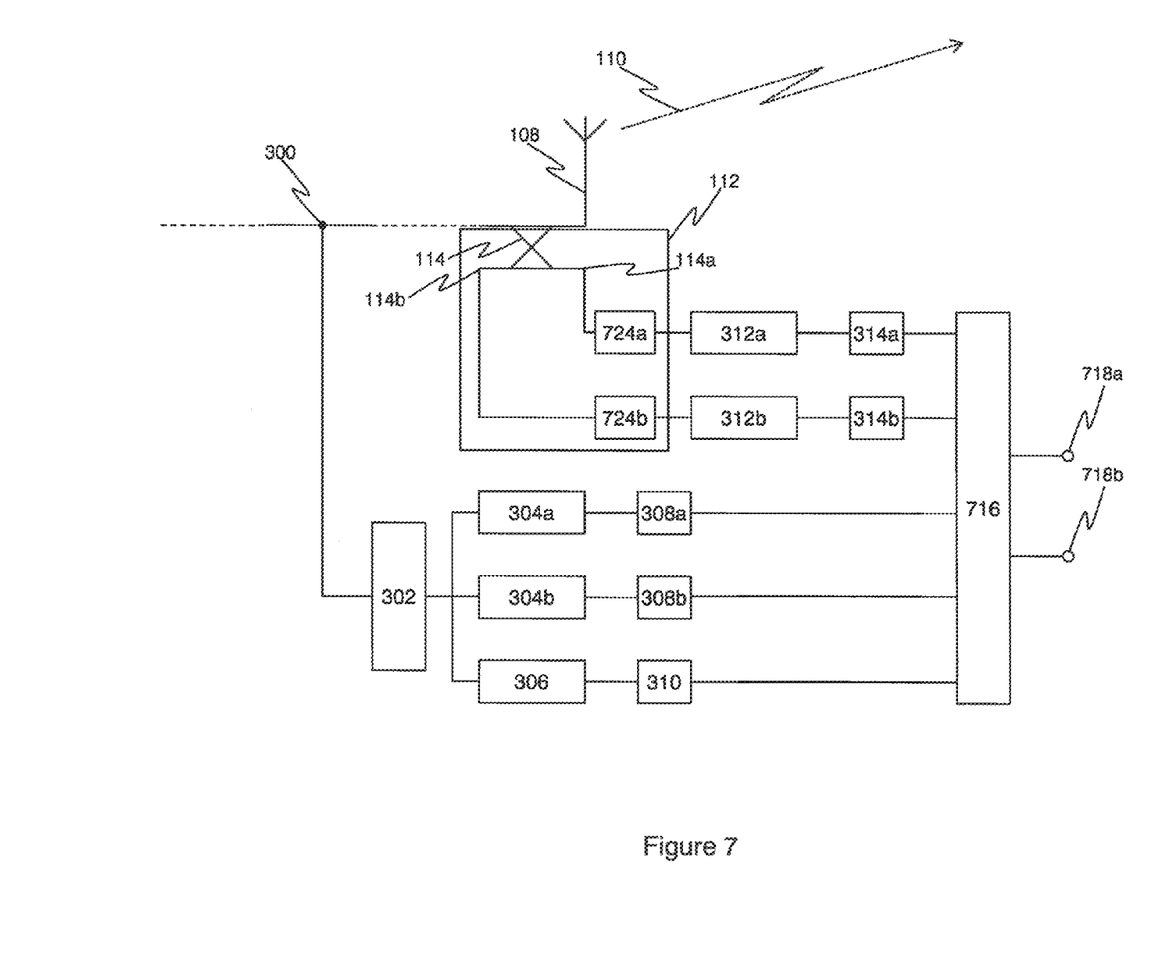
FIG. 7 shows schematically the transmitted signal characteristic determination hardware of a wireless communication device according to embodiments.

FIG. 7 shows schematically the transmitted signal power determination hardware of wireless communication device 100 according to embodiments. In these embodiments, the signal measured at the measurement receiver is measured during more than one time period in order to determine both the forward and reflected power of the transmitted signal. The operation of receiver 108, transmitted signal 110, input signal 300, power calculation unit 302 integrating units 304a, 304b, 306, 312a and 312b, and dividing units 308a, 308b, 310, 314a and 314b are the same as described previously in relation to FIG. 6. In the embodiments depicted in FIG. 7, the measurement receiver includes a coupler 114 including at least two ports. The forward signal power of transmitted signal 110 is measured via a first port 114a of coupler 114 and the reflected power of transmitted signal 110 is measured via a second port 114b of coupler 114.

During transmission, the power of the transmitted signal measured at measurement receiver 112 is measured over both the first time period and the third time period. The first port 114a of coupler 114 is connected via measurement unit 724a to integrating unit 312a, which integrates the forward power of the signal measured at measurement receiver 112 over the first time period $t_1$. The second port 114b of coupler 114 is connected via measurement unit 724b to integrating unit 312b, which integrates the reflected power of the signal measured at measurement receiver 112 over the third time period $t_3$. Measurement units 724a and 724b may, for example, compromise a power detector or direct conversion receiver (the operation of which is described above). According to embodiments, the outputs of measurement units 724a and 724b are digital signals. Measurement receiver 112 may also include one or more further components (not shown). The result produced by integration unit 312a is fed into dividing unit 314a which divides the result produced by integrating unit 312a by the duration of the first time period in order to determine an average measured forward power value over the first time period. Likewise, the result produced by integration unit 312b is fed into dividing unit 314b which divides the result produced by integrating unit 312b by the duration of the third time period in order to determine an average measured reflected power value over the third time period.

Determining unit 716, is adapted to operate on the value for the first time period, the value for the second time period, the value for the third time period, the measured average forward power value for the first time period and the measured average reflected power value for the third time period in order to determine determined average forward power value 718a and determined average reflected power value 718b for the second time period.

According to embodiments, determining unit 716 divides the value for the second time period by the value for the first time period in order to determine a first ratio of the values for the second and first time periods. The measured average forward power value for the first time period is then scaled by the first ratio to determine a determined average forward power value 718a for the second time period.

In embodiments, determining unit 716 divides the value for the second time period by the value for the third time period in order to determine a second ratio of the values for the second and third time periods. The measured average reflected power value for the third time period is then scaled by the second ratio to determine a determined average reflected power value 718b for the second time period.

The determined average forward and reflected power values for the second time period may then be compared to determine a forward and reflected power difference or ratio. According to embodiments, the determined power values for the second time period are average power values.

Figure 8:
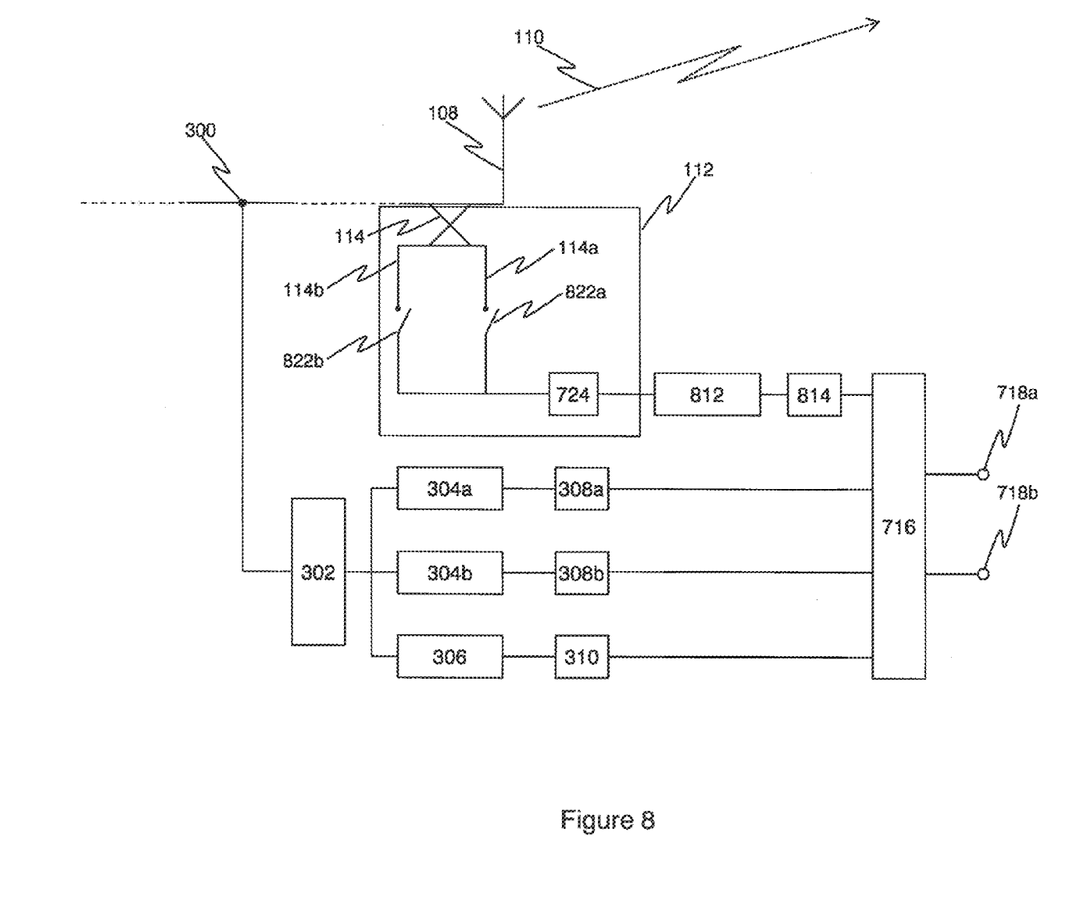
FIG. 8 shows schematically the transmitted signal characteristic determination hardware of a wireless communication device according to embodiments.

FIG. 8 shows schematically the transmitted signal power determination hardware of wireless communication device 100 according to embodiments. In these embodiments, the signal measured at the measurement receiver is measured during more than one time period in order to determine both the forward and reflected power of the transmitted signal. The operation of antenna 108, transmitted signal 110, input signal 300, power calculation unit 302, integrating units 304a, 304b and 306, dividing units 308a, 308b and 310 and determining unit 716 are the same as described previously in relation to FIG. 7. However, in the embodiments shown in FIG. 8, a single integrating unit 812 is used in place of integrating units 312a and 312b. This further allows a single measurement unit 724 to be used in place of measurement units 724a and 724b. In such embodiments, switches 822a and 822b are used to select the appropriate port on coupler 114 to electrically connect the measured signal to measurement unit 724 during each time period. During transmission, the forward power of the transmitted signal is measured during the first time period $t_1$ by electrically connecting the first port 114a of coupler 114 via measurement unit 724 to integrating unit 812 by closing switch 822a and opening switch 822b. The reverse power of the transmitted signal is measured during the third time period $t_3$ by electrically connecting the second port 114b of coupler 114 via measurement unit 724 to single integrating unit 812 by opening switch 822a and closing switch 822b.

In embodiments, a single dividing unit 814 is provided in place of dividing units 314a and 314b. Dividing unit 814 divides the result produced by integrating unit 812 in relation to the first time period by the duration of the first time period in order to determine an average measured forward power value over the first time period. Likewise, dividing unit 814 divides the result produced by integrating unit 812 in relation to the third time period by the duration of the third time period in order to determine an average measured reflected power value over the third time period. These are then provided to determining unit 716 to determine determined average forward and reflected power values 718a and 718b as described previously in relation to FIG. 7.

According to embodiments, one or more of the input signals and/or signals measured at the measurement receiver are stored in memory buffers for later processing. This alleviates the requirement to perform the associated calculations in real time. This in turn enables the subsequent processing (e.g. determination of average signal powers etc.) to be performed by more general purpose hardware, such as a digital signal processor (DSP).

According to embodiments, the power detector in the measurement receiver may be implemented without requiring the use of a divider. In some such embodiments, DC characteristics of the power amplifier, such as the supply current, are used to measure the power. Alternatively, a scaled replicate transistor having the same input as the main amplifier transistor can be used to measure the power.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may include circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Although at least some aspects of the embodiments described herein with reference to the drawings include computer processes performed in processing systems or processors, the present disclosure also extends to computer programs, particularly computer programs on or in a carrier, adapted for putting the present disclosure into practice. The program may be in the form of non-transitory source code, object code, a code intermediate source and object code such as in partially compiled form, or in any other non-transitory form suitable for use in the implementation of processes according to the present disclosure. The carrier may be any entity or device capable of carrying the program. For example, the carrier may include a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

According to embodiments, there is provided a method, apparatus and/or computer software for use in determining the average power of a signal transmitted from a wireless transmitter in a telecommunications network, the wireless transmitter including a measurement receiver, the method including:

determining, on the basis of at least one signal supplied to the transmitter, a first value proportional to the average power of the transmitted signal over a first time period;

determining, on the basis of the at least one signal supplied to the transmitter, a second value proportional to the average power of the transmitted signal over a second, different, time period; and determining, on the basis of at least the first value, the second value and a measured average power value for the transmitted signal measured at the measurement receiver over the first time period, a determined average power value for the transmitted signal in relation to the second time period.

However, according to further embodiments, the first value and the second value include alternative values that are not proportional to the average power of the transmitted signal over the respective time period. Some such alternative values (or 'characteristics') may include, for example, the total consumed energy of the transmitted signal, the magnitude, the amplitude, the RMS power, the RMS magnitude, RMS amplitude, the power gain, the voltage gain, and/or other values/characteristics of the transmitted signal.

According to some such embodiments, one or more of the measured and determined characteristics are average or RMS values. It will be apparent to those skilled in the art that the determined RMS or average magnitude or power values can be used to determine other signal characteristics, such as voltage or power gain between certain blocks.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which are defined in the accompanying claims.

What is claimed is:

1. A method of determining a characteristic of a signal to be transmitted from a wireless transmitter in a telecommunications network, the wireless transmitter comprising a measurement receiver, the method comprising:

determining, using a signal characteristic determination hardware and on the basis of at least one signal being supplied to the transmitter for use in forming the signal to be transmitted from the transmitter, a first characteristic of the signal to be transmitted from the transmitter over a first time period;

determining, using the signal characteristic determination hardware and on the basis of the at least one signal being supplied to the transmitter, a second characteristic of the signal to be transmitted from the transmitter over a second, different, time period; and determining, using the signal characteristic determination hardware and on the basis of at least the first characteristic, the second characteristic and a measured characteristic of the signal to be transmitted from the transmitter that is measured at the measurement receiver over the first time period, a third characteristic of the signal to be transmitted from the transmitter for the second time period.

2. The method according to claim 1, wherein the measured characteristic comprises a measured average power value for the signal to be transmitted from the transmitter, and the third characteristic comprises an average power value for the signal to be transmitted from the transmitter.

3. The method according to claim 1, wherein one or more of the first characteristic and the second characteristic comprise values proportional to an average power of the signal to be transmitted from the transmitter over the respective time period.

4. The method according claim 1, wherein one or more of the first characteristic, the second characteristic, the measured characteristic and the third characteristic comprise one or more of:
   a consumed energy of the signal to be transmitted from the transmitter,
   a power of the signal to be transmitted from the transmitter,
   a magnitude of the signal to be transmitted from the transmitter,
   an amplitude of the signal to be transmitted from the transmitter,
   an average magnitude of the signal to be transmitted from the transmitter,
   an average amplitude of the signal to be transmitted from the transmitter,
   a power gain of the signal to be transmitted from the transmitter, and
   a voltage gain of the signal to be transmitted from the transmitter.

5. The method according to claim 1, wherein the at least one signal being supplied to the transmitter comprises a digital signal.

6. The method according to claim 1, wherein the determination of the third characteristic of the signal comprises scaling the measured characteristic by a ratio of the second characteristic to the first characteristic.

7. The method according to claim 1, wherein the determination of one or more of the first characteristic and the second characteristic comprise performing an integration operation on the at least one signal being supplied to the transmitter for the respective time period.

8. The method according to claim 7, wherein the integration of the at least one signal being supplied to the transmitter is performed in a digital domain.

9. The method according to claim 1, wherein the measurement of the measured characteristic comprises performing an integration operation on the signal to be transmitted from the transmitter that is measured at the measurement receiver over the first time period.

10. The method according to claim 1, wherein one or more of the first characteristic and the second characteristic are determined further on the basis of a further signal being supplied to the transmitter.

11. The method according to claim 10, wherein the at least one signal being supplied to the transmitter and the further signal being supplied to the transmitter comprise two signals used in a quadrature encoded modulation scheme to form the signal to be transmitted from the transmitter.

12. The method according to claim 1, comprising determining, on the basis of the at least one signal being supplied to the transmitter, a fourth characteristic of the signal to be transmitted from the transmitter over a third time period, different from the first time period and the second time period,
   wherein the characteristic of the second time period is determined further on the basis of the fourth characteristic and a further measured characteristic of the signal to be transmitted from the transmitter that is measured at the measurement receiver over the third time period.

13. The method according to claim 1, comprising determining, on the basis of the at least one signal being supplied to the transmitter, a fourth characteristic of the signal to be transmitted from the transmitter over a third time period, different from the first time period and the second time period, and
   determining, on the basis of at least the fourth characteristic, the second characteristic and a further measured characteristic of the signal to be transmitted from the transmitter that is measured at the measurement receiver over the third time period, an average reflected characteristic of the signal to be transmitted from the transmitter for the second time period.

14. The method according to claim 1, wherein the second time period comprises one or more of:
   an allocated transmission slot for the signal to be transmitted from the transmitter in a communication session, and
   a power control slot in a communication session.

15. The method according to claim 1, further comprising one or more of:
   operating the wireless transmitter according to the third characteristic, and
   signaling the determined characteristic to the network.

16. The method according to claim 1, comprising storing one or more of the at least one signal being supplied to the transmitter and the signal to be transmitted from the transmitter in a buffer prior to determining the third characteristic of the signal to be transmitted from the transmitter for the second time period, the determining of the third characteristic of the signal to be transmitted from the transmitter for the second time period being carried out at least on the basis of the contents of the buffer.

17. The method according to claim 1, wherein one or more of the determining steps are carried out by a digital signal processor.

18. An apparatus for use in determining a characteristic of a signal to be transmitted from a wireless transmitter, the wireless transmitter comprising a measurement receiver, the apparatus being adapted to:
   determine, on the basis of at least one signal being supplied to the transmitter for use in forming the signal to be transmitted from the transmitter, a first characteristic of the signal to be transmitted from the transmitter over a first time period;
   determine, on the basis of the at least one signal being supplied to the transmitter, a second characteristic of the signal to be transmitted from the transmitter over a second, different, time period; and determine, on the basis of at least the first characteristic, the second characteristic and a measured characteristic measured at the measurement receiver over the first time period, a third characteristic of the signal to be transmitted from the transmitter for the second time period.

19. The apparatus according to claim 18, wherein the apparatus further comprises one or more of:
the wireless transmitter,
the measurement receiver,
a chipset,
a front end module,
a transceiver, and
a user equipment.

20. A non-transitory computer-readable storage medium comprising a set of computer-readable instructions stored thereon, which, when executed by a processing system, cause the processing system to carry out a method for use in determining a characteristic of a signal to be transmitted from a wireless transmitter in a telecommunications network, the wireless transmitter comprising a measurement receiver, the computer-readable instructions being adapted to cause the processing system to:

determine, on the basis of at least one signal being supplied to the transmitter for use in forming the signal to be transmitted from the transmitter, a first characteristic of the signal to be transmitted from the transmitter over a first time period;

determine, on the basis of the at least one signal being supplied to the transmitter, a second characteristic of the signal to be transmitted from the transmitter over a second, different, time period; and determine, on the basis of at least the first characteristic, the second characteristic and a measured characteristic of the signal to be transmitted from the transmitter that is measured at the measurement receiver over the first time period, a third characteristic of the signal to be transmitted from the transmitter for the second time period.

* * * * *